(12) United States Patent
Dallard et al.

(10) Patent No.: US 7,333,610 B2
(45) Date of Patent: Feb. 19, 2008

(54) SYSTEM AND METHOD FOR PRE-ENCRYPTION OF TRANSMITTED CONTENT

(75) Inventors: Nigel Stephen Dallard, Winchester (GB); Nigel Smith, Twyford (GB); David Samuel Chechik, Jerusalem (IL)

(73) Assignee: NDS Ltd, Middlesex (GB)

( * ) Notice: Subject to any disclaimer, the term of this patent is extended or adjusted under 35 U.S.C. 154(b) by 859 days.

(21) Appl. No.: 10/344,139

(22) PCT Filed: Aug. 10, 2001

(86) PCT No.: PCT/IL01/00741

§ 371 (c)(1),
(2), (4) Date: Feb. 6, 2003

(87) PCT Pub. No.: WO02/15578

PCT Pub. Date: Feb. 21, 2002

(65) Prior Publication Data

US 2003/0188154 A1    Oct. 2, 2003

Related U.S. Application Data (60) Provisional application No. 60/298,958, filed on Jun. 18, 2001.

(30) Foreign Application Priority Data

Aug. 11, 2000  (GB) ................................. 0019879.6
Jun. 11, 2001  (GB) ................................. 0114235.5

(51) Int. Cl.
*H04L 9/00*  (2006.01)
*H04N 7/167* (2006.01)

(52) U.S. Cl. ..................... 380/239; 380/201; 380/210; 713/185; 713/193; 705/51

(58) Field of Classification Search .................... None
See application file for complete search history.

(56) References Cited

U.S. PATENT DOCUMENTS 5,282,249 A    1/1994   Cohen et al.

(Continued)

FOREIGN PATENT DOCUMENTS

DE    199 57 466 A1    5/2001

(Continued)

OTHER PUBLICATIONS

*Information technology—Generic coding of moving pictures and associated audio information: Systems* (ISO/IEC 13818-1: 1996).

(Continued)

*Primary Examiner*—Gilberto Barrón, Jr.
*Assistant Examiner*—Laurel Lashley
(74) *Attorney, Agent, or Firm*—Welsh & Katz Ltd (57) ABSTRACT

A system and a method for the creation and transmission of "pre-encrypted" digital content, which is encrypted before being placed on a distributed media transmission server. Preferably a plurality of such servers are used, for example in order to be able to place such a media transmission server in physical proximity to the end user client, whether in terms of geographical proximity or proximity through the network. Use of a plurality of transmission servers also optionally enables the media content to be transmitted flexibly, according to the request of the end user through the end user client.

26 Claims, 5 Drawing Sheets

U.S. PATENT DOCUMENTS

| | | |
|---|---|---|
| 5,481,609 A | 1/1996 | Cohen et al. |
| 6,178,242 B1 | 1/2001 | Tsuria |
| 6,449,719 B1 | 9/2002 | Baker |
| 2002/0114465 A1 | 8/2002 | Shen-Orr et al. |

FOREIGN PATENT DOCUMENTS

| | | | |
|---|---|---|---|
| EP | 0 858 184 A2 | | 8/1998 |
| EP | 936774 A1 | * | 8/1999 |
| KR | 1998-0007164 | | 3/1998 |
| WO | WO 99/12350 | | 3/1999 |
| WO | WO 00/54493 | | 9/2000 |
| WO | WO 00/67483 A1 | | 11/2000 |
| WO | WO 01/15448 A1 | | 3/2001 |
| WO | WO 01/35669 A1 | | 5/2001 |
| WO | WO 01/41442 A1 | | 6/2001 |
| WO | WO 01/50755 A1 | | 7/2001 |

OTHER PUBLICATIONS

*MPEG-2 Pocket Guide, Digital Broadcast Systems* (Wavetek Wandel Goltermann; Pocket Guide to MPEG-2 Fundamentals and Testing, vol. 6) 2001.

English translation of Aug. 30, 2007 Office Action in connection with prosecution of corresponding Korean patent application.

* cited by examiner

SYSTEM AND METHOD FOR PRE-ENCRYPTION OF TRANSMITTED CONTENT

The present application is a 35 USC § 371 application of PCT/IL01/00741, filed on 10 Aug. 2001 and entitled System and Method for Pre-Encryption of Transmitted Content, which was published on 21 Feb. 2002 with International Publication No. WO 02/15578 A1, and which claims the benefit of the filing date of provisional application Ser. No. 60/298,958 which was filed on 18 Jun. 2001.

FIELD OF THE INVENTION

The present invention relates to a system and a method for pre-encryption of transmitted content.

BACKGROUND OF THE INVENTION

Digital content can easily and efficiently be delivered through any type of suitable network, such as a cable network and/or a computer network. In particular, digital content can be efficiently delivered to individual users upon request, thereby enabling users to receive personalized content "on demand". Such personalization is particularly useful for digital content, such as video data and audio data, for display and/or playback through various types of media devices, in which the taste of the user is highly individualized. For example, users could select individual portions of music, television programs, movies and other types of entertainment, and receive these selections as digital content.

However, in order for digital content to be fully effectively delivered to users, a number of mechanisms need to be provided. First, if payment is required, then the digital content should be secure against theft, such that only authorized users can retrieve and display the digital content. Second, the user should also easily be able to effect payment where required, in order to encourage proper payment and usage. Third, neither of these mechanisms should interfere with the efficient delivery and display/playback of the digital content.

One attempt to provide such effective mechanisms is described in U.S. Pat. Nos. 5,282,249 and 5,481,609, which are hereby incorporated by reference as if fully set forth herein. The disclosed system enables a signal containing media content to be broadcast widely, yet only to be played back or otherwise displayed by authorized users. This signal could contain a television program for example. The signal is scrambled, such that the authorized users are able to descramble the signal and play back or otherwise display the media content only with the proper security device, such as a smart card for example. Thus, widely received media content is still protected from access by unauthorized users.

The scrambled television data streams described in U.S. Pat. Nos. 5,282,249 and 5,481,609 feature both scrambled data representing television signals and coded control messages, also known as ECMs. These ECMs contain, in a coded form, data necessary for generating a control word (CW) which may be used to descramble the scrambled data representing television signals.

While U.S. Pat. Nos. 5,282,249 and 5,481,609 describe an analog system, that is, a system in which analog television data streams are broadcast to television sets, it is appreciated that similar ECM methods may also be used for digital television data streams. Generally, the scrambling techniques used for scrambling analog television signals such as, for example, the well-known "cut-and-rotate" technique, are chosen for their particular applicability to analog signals. However, scrambling of digital television signals preferably employs other techniques, which are well-known in the art and which are more appropriate to digital signals. One example of such a technique is the application of the well-known DES algorithm to the digital television signals.

Methods of transmitting a scrambled digital signal, including ECMs, are described in the MPEG-2 standard, ISO/IEC 13818-1, Apr. 15, 1996 and subsequent editions.

Another attempted solution to the problem of content protection is described in published European Patent Application No. EP 0858184 and corresponding U.S. Pat. No. 6,178,242, which disclose a digital recording protection system and which are hereby incorporated by reference as if fully set forth herein. The disclosed system enables the digital content to be sent in a scrambled format, such that the digital content cannot be read and/or displayed without a key. The key is obtained from a control message, which is only sent to authorized users. Preferably, the key is obtained from coded information contained within the Entitlement Control Message, or ECM, for generating a code word associated with the ECM. Thus, only authorized users are able to correctly read and/or display the digital content.

In addition, the system and method described in European Patent Application No. EP 0858184 enable the authorized user to record and playback or otherwise display the digital content, while preventing the user from producing and distributing multiple playable copies of the digital content to other, non-authorized users. Therefore, the authorized user is able to fully use and enjoy the digital content, while the content itself is still protected from unauthorized use.

Figure 1:
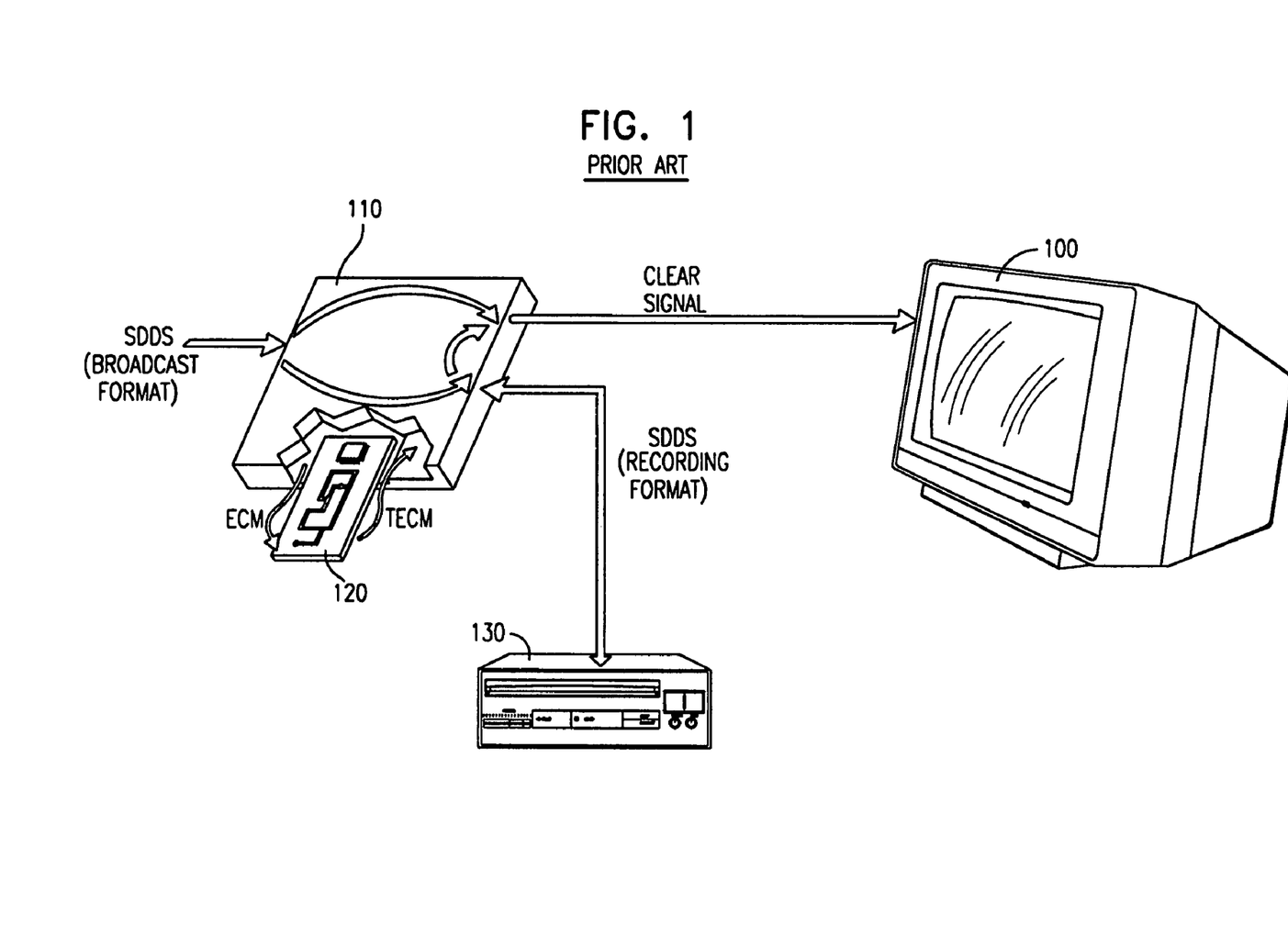
FIG. 1 is a schematic block diagram of a background art system.

As described in European Patent Application No. EP 0858184, and as shown in background art FIG. 1 taken from this Application, such a system includes a media device 100, such as a television set, for playing the digital content, such as a television program for example. Media device 100 is connected to an integrated receiver-decoder (IRD) 110, for receiving and decoding the scrambled digital content. The system also features a removable security element 120, such as a smart card for example, for providing control words for unscrambling, or otherwise rendering into a clear format, the scrambled digital content by IRD 110. In addition, the system features a digital VCR 130 for communicating with media device 100 and IRD 110. Digital VCR 130 is able to record the digital content for later playback and/or display by media device 100.

IRD 110 receives scrambled digital content which features a plurality of ECMs, each of which is associated with, and is typically followed by, a scrambled digital data segment, containing the actual digital content. Each ECM includes coded information which can be used to generate a code word for unscrambling the associated scrambled digital data segment. Typically, removable security element 120 generates the code word. IRD 110 is then able to descramble the scrambled digital content, for example for being played by media device 100.

Figure 2:
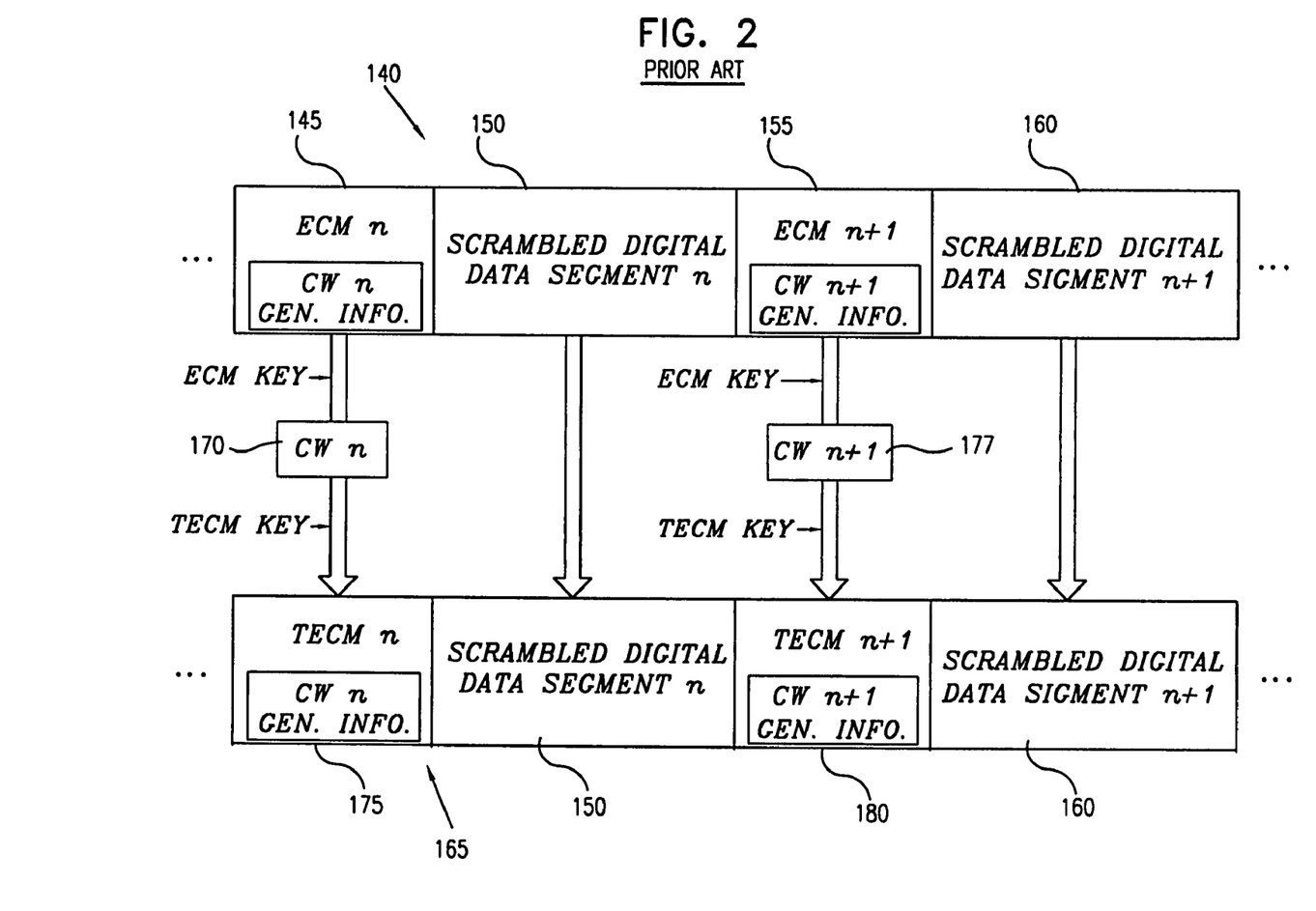
FIG. 2 shows a flow diagram illustrating the production of the scrambled digital content according to the background art.

Background art FIG. 2, also taken from European Patent Application No. EP 0858184, is a flow diagram illustrating the production of the scrambled digital content. As shown, the scrambled digital content is produced as an SDDS (scrambled digital data stream) 140, featuring a plurality of ECMs such as an nth ECM 145, and a plurality of associated SDSEGs such as an nth SDSEG (scrambled digital data segment) 150 which is associated with nth ECM 145. IRD 110 of FIG. 1, in cooperation with removable security element 120, is able to use SDDS 140 in order to form a recording SDDS 165. Recording SDDS 165 is produced with the addition of a TECM (transformed ECM) key, which is permanently associated with the system of FIG. 1, even if removable security element 120 is changed, replaced or exchanged, for example. This TECM key is used to make a plurality of TECMs, shown as nth TECM 175, from the code words of the ECMs. Thus, a system which did not feature the correct TECM key could not descramble the recording SDDS 165 for playing back or otherwise displaying the digital content, while the authorized user is always able to play back or otherwise display the recorded digital content as long as the TECM key is available.

PCT Application No. WO 00/01149 describes a system for data stream processing which enables encrypted data streams to be transmitted to the end user in advance of being displayed. The encrypted data streams are stored and are then only decrypted at the time of display or "play back".

PCT Application No. WO 01/35669 describes a mechanism for processing a scrambled data stream, in which points within the stream are selected heuristically for recording the scrambled stream. The scrambled stream is only unscrambled, or rendered accessible for display, at the time of playback.

The disclosures of all references mentioned above and throughout the present specification are hereby incorporated herein by reference.

SUMMARY OF THE INVENTION

None of the background art solutions teaches or suggests a solution which combines the security of broadcasting from a central entity with the flexibility of distributed transmission entities. In addition, none of the background art solutions teaches or suggests a solution which provides greater flexibility for transmission of content while still maintaining the security of the digital content.

Therefore, there is an unmet need for, and it would be highly useful to have, a system and a method for distributed, secure transmission of encrypted digital content, which optionally provides for increased flexibility of transmission mechanisms, such as point-to-point and/or reception of the encrypted content in advance of playback or display. The background art requires control to be maintained at a central broadcasting entity, in order for the encryption keys and/or information for generating such keys to be correctly distributed. By contrast, the system and method of the present invention do not require any such transmission of the encrypted content by a central broadcasting entity, thereby providing greater flexibility for transmission of the content.

The present invention provides a system and a method for the creation and transmission of "pre-encrypted" digital content, which is encrypted before being placed on a distributed media transmission server. Preferably a plurality of such servers are used, for example in order to be able to place such a media transmission server in physical proximity to the end user client, whether in terms of geographical proximity or proximity through the network. As described in greater detail below, use of a plurality of media transmission servers also optionally enables the media content to be transmitted flexibly, according to the request of the end user through the end user client.

The key which is used to decrypt the encrypted data is preferably itself generatable from information which is contained in a SECM (Server ECM, or Entitlement Control Message). The encrypted data may also optionally be accessed through the use of a control word. Optionally the key and the control word are the same entity, or alternatively the key could optionally be generatable from the control word. The control word in turn could optionally be generatable from control word generating information, which is more preferably contained in the SECM.

The SECM itself is preferably not sent to the end user client. Instead, upon request by the end user client, or optionally before such a request is sent, a PECM (Personalized ECM) is generated at least partially from the control word generating information contained in the SECM. The PECM therefore preferably contains information which is sufficient for the end user client to access the encrypted content. Optionally and more preferably, the control word generating information contained in the PECM is at least partially generated according to at least one characteristic of the end user client.

More preferably, only the particular end user client for which the PECM has been generated is then able to use the information contained in the PECM to access the encrypted data.

According to a preferred embodiment of the present invention, the encrypted data is divided into segments, according to a predetermined period of time for each segment or crypt-period, such that the SECM and hence the PECM are changed periodically. In order to accommodate "fast-forward" and "rewind" modes for viewing the content by the end user client, in which the segments of data are not played sequentially, optionally and preferably the media transmission server dynamically edits the data. As such editing cannot be performed if the data is encrypted, more preferably at least portions of the data are not encrypted.

Hereinafter, the terms "file", "portion" or "item", with regard to digital content, are used interchangeably and refer to any unit of data for such digital content, whether as a functional unit such as a packet for example, or as a conceptual unit such as a television program for example.

For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++, Java and Assembly.

In addition, the present invention could be implemented as software, firmware or hardware, or as a combination thereof For any of these implementations, the functional steps performed by the method could be described as a plurality of instructions performed by a data processor. In addition, for the software implementation, the functional steps performed by the method could be described as a plurality of instructions performed by a computer software product.

Hereinafter, "Applied Cryptography" by Bruce SCHNEIDER, John Wiley 2and ed. 1996, is incorporated by reference as if fully set forth herein, for the teachings regarding cryptography and techniques for implementation thereof.

This Application claims priority from U.S. Provisional Application No. 60/298,958, filed on 18 Jun. 2001; United Kingdom Patent Application No. 0019879.6, filed on Aug. 11, 2000; and United Kingdom Patent Application No. 0114235.5, filed on Jun. 11, 2001; all of which are hereby incorporated by reference as if fully set forth herein.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system and a method for the creation and transmission of "pre-encrypted" digital content, which is encrypted before being placed on a distributed media transmission server. Preferably a plurality of such servers are used, for example in order to be able to place such a media transmission server in physical proximity to the end user client, whether in terms of geographical proximity or proximity through the network. As described in greater detail below, use of a plurality of transmission servers also optionally enables the media content to be delivered more flexibly, according to the request of the end user through the end user client.

The key which is used to decrypt the encrypted data is preferably itself generatable from information which is contained in a SECM (Server ECM, or Entitlement Control Message). The encrypted data may also optionally be accessed through the use of a control word. Optionally the key and the control word are the same entity, or alternatively the key could optionally be generatable from the control word. The control word in turn could optionally be generatable from control word generating information, which is more preferably contained in the SECM.

The SECM itself is preferably not sent to the end user client. Instead, upon request by the end user client, or optionally before such a request is sent, a PECM (Personalized ECM) is generated at least partially from the control word generating information contained in the SECM. The PECM therefore preferably contains information which is sufficient for the end user client to access the encrypted content. Optionally and more preferably, the control word generating information contained in the PECM is at least partially generated according to at least one characteristic of the end user client.

Alternatively, the key and/or the control word could optionally be sent directly to the end user client for decrypting the encrypted content, although this implementation is less preferred for security reasons.

More preferably, only the particular end user client for which the PECM has been generated is then able to use the information contained in the PECM to access the encrypted data.

It should be noted that the key and/or control word for decrypting the encrypted content is not necessarily the same key and/or control word which is used for encrypting the content, as both asymmetric and symmetric encryption are suitable for the present invention.

According to a preferred embodiment of the present invention, the encrypted data is divided into segments, according to a predetermined period of time for each segment or cryptoperiod, such that the SECM and hence the PECM are changed periodically. In order to accommodate "fast-forward" and "rewind" modes for viewing the content by the end user client, in which the segments of data are not played sequentially, optionally and preferably the media transmission server dynamically edits the data. As such editing cannot be performed if the data is encrypted, more preferably at least portions of the data are not encrypted.

According to a preferred embodiment of the present invention, at least one PECM containing control word generating information necessary to decrypt the first segment of the content to be displayed is sent to the end-user client in advance of said content. The other PECMs necessary to decrypt subsequent parts of the content are then preferably delivered in advance of the corresponding segments of the content. Alternatively, all the PECMs necessary to decrypt all of the content can be delivered before the actual content.

More preferably, as each segment or crypt-period is about to start, a marker packet or other unit of data is included in the content data stream to indicate which control word/key is required to decrypt the new segment of the content.

Systems for scrambling/encrypting digital content data are well known in the art, for example in U.S. Pat. Nos. 5,282,249 and 5,481,609, both to Cohen et al., which are hereby incorporated by reference as if fully set forth herein. The disclosed system enables a signal containing media content, such as a television program for example, to be transmitted widely, yet only to be played back or otherwise displayed by authorized users.

Scrambled television data streams described in the Cohen et al patents comprise both scrambled data representing television signals and coded control messages, also known as ECMs (Entitlement Control Messages). The ECMs of Cohen et al comprise, in a coded form, data necessary for generating a control word (CW) which may be used to descramble the scrambled data representing television signals.

Data necessary for generating a control word is known in the background art to take many different forms and may include, in general, at least any of the following: a control word; an encrypted control word packet which is intended to be decrypted before use; and a seed to a generating function such as, for example, a one-way function which generates the control word upon input of the seed. Throughout the present specification and claims the term "control word generating information" is used to designate data necessary for generating a control word and/or key in any appropriate form, as described above.

The principles and operation of the present invention may be better understood with reference to the drawings and the accompanying description.

Figure 3:
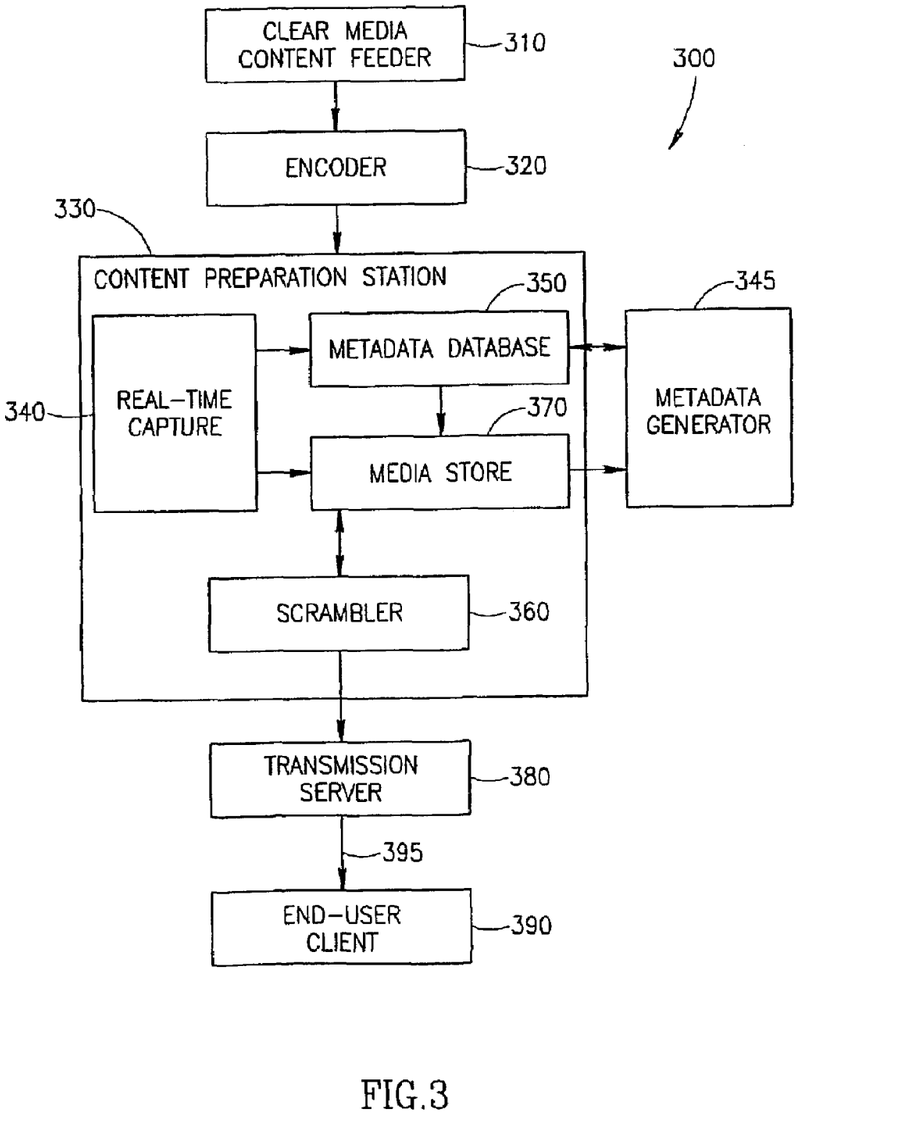
FIG. 3 is a schematic block diagram of an illustrative system according to the present invention.

Referring now to the drawings, FIG. 3 is a schematic block diagram of an illustrative system according to the present invention. Although the operation of the system is described with regard to television program content, it is understood that this is for the purposes of illustration only and is without any intention of being limiting in any way.

As shown, a system 300 according to the present invention features a clear media content feeder 310 for providing unencrypted, or "clear" digital media content. Such digital media content is optionally audio and/or video content, for example. For the purposes of explanation only and without wishing to be limiting, the digital content is assumed to at least include video content.

The unencrypted or "clear" video content is passed to an encoder 320, which compresses the digital media content. Preferably, encoder 320 also translates the content into a suitable transmission format, which optionally and more preferably is the MPEG-2 (Moving Pictures Expert Group 2) SPTS (Single Program Transport Stream) format (see for example http://www.cselt.it/mpeg for a description). This format is particularly preferred for transmission of a single television program or other media content in a transport stream at any given time. The MPEG-2 standard also defines compression methods for compressing the digital media content. Alternatively, other formats may optionally be used which are suitable for transport of a plurality of such programs in a single transport stream, although for the sake of clarity, the operation of the present invention is described with regard to the MPEG-2 SPTS format.

The formatted digital content is then sent to a content preparation station 330 according to the present invention. Content preparation station 330 preferably handles at least the initial encryption steps. Content preparation station 330 preferably features a real-time capture unit 340, for capturing the correctly formatted content. Optionally, real-time capture unit 340 analyzes the content for determining metadata related to the content, such as the start and end points of the television program, for example. Real-time capture unit 340 preferably automatically generates the metadata. A metadata generator 345 preferably permits the manual generation and/or editing of the metadata. This metadata is then preferably sent to a metadata database 350.

The clear digital content is then sent to a scrambler 360, preferably within content preparation station 330, for being scrambled or encrypted. Scrambler 360 preferably follows the real-time MPEG-2 multiplexer format for scrambling the digital content, although as previously described, more preferably the MPEG-2 SPTS format is used. Scrambler 360 also preferably generates an encryption key for at least encrypting the scrambled or encrypted content, although alternatively such a key is generated by a separate key generating unit (not shown). It should be noted, as described above, that different keys and/or control words may optionally be used for encrypting and decrypting the content. Any type of suitable encryption algorithm may optionally be used, including but not limited to, triple-DES, DES and the industry standard DVB (Digital Video Broadcast consortium) scrambling algorithm. The encrypted content is then preferably stored in a media store 370.

At some point, a decryption key needs to be created for at least decrypting the scrambled or encrypted content, although alternatively such a key is generated by a separate key generating unit (not shown). More preferably, this key and/or control word for at least decrypting the encrypted content is not directly generated by scrambler 360, or at least such direct generation is not necessary. Instead, scrambler 360 more preferably generates one or more ECMs (Entitlement Control Messages), which contain the information which is necessary to generate the control word (control word generating information) and/or the control word itself. Preferably, control word generating information is generated and placed into the ECM. The generation and transmission of such ECMs is previously described with regard to background art FIGS. 1 and 2.

Preferably, each ECM is encrypted and/or digitally signed to prevent an unauthorized user from tampering with the control word and/or control word generating information.

Also preferably, the key/control word for decrypting and/or encrypting the digital content is produced from the control word generating information in the ECM through some type of one-way function. Examples of suitable one-way functions are well known in the art (see for example previously incorporated "Applied Cryptography" by Bruce SCHNEIDER, John Wiley 2and ed. 1996).

More preferably, two different types of ECMs are used: PECMs (personal ECMs) and SECMs (server ECMs). SECMs are preferably used by content preparation station 330 to contain the general control word generating information. As described in greater detail below, more preferably, the SECMs are not sent to the end-user client (shown as end-user client 390). Instead, PECMs, which are most preferably personalized for each end-user client, are generated from the control word generating information contained in the SECM and are sent to end-user client 390 for accessing the encrypted data. Thus, the data does not need to be separately encrypted for each end-user client, yet access is still controlled such that only the particular end-user client 390 for which the PECM has been generated is preferably able to access the encrypted data.

SECMs optionally and preferably include business rules which are associated with the scrambled content. Examples of such business rules include, but are not limited to, parental rating, embargo dates, regional blackouts and so forth.

The SECMs are preferably stored in a separate file, rather than being stored with the encrypted digital content itself. Such storage of the SECMs in a separate file is preferred in order to enable the digital content to be displayed "out of order", rather than in a simple linear sequence. For example, the user might optionally prefer to "fast forward" the displayed content to a later segment without displaying the intervening segments. As described in greater detail below, storing the SECMs in a separate file enables such content to be displayed in a flexible order.

The separate file also preferably includes information about the start and end of each "crypt-period", or portion of the encrypted content which may be accessed through a particular control word. The crypt-periods may optionally vary in size, but more preferably are sufficiently long that the next control word generating information can be received, and the decryption key generated, by end-user client 390 before the next crypt-period begins.

Once the digital media content has been encrypted, preferably the encrypted content, the metadata and the SECMs are loaded onto content preparation station 330 for being sent to a transmission server 380. Transmission server 380 is preferably one of a plurality of such servers (not shown), which transmit the encrypted digital media content to an end-user client 390. Transmission server 380 is optionally connected to end-user client 390 through a network 395 as shown, although alternatively, transmission server 380 is implemented with end-user client 390 at a single physical location. For the purposes of description only and without any intention of being limiting, transmission server 380 is assumed to be connected to end-user client 390 through network 395.

A plurality of transmission servers 380 is preferred in order for end-user client 390 to receive encrypted data from a selected transmission server 380 which is more preferably able to deliver the highest quality of service. For example, such a transmission server 380 may optionally be in closest physical proximity to end-user client 390. However, it should be noted that optionally, a transmission server 380 is located within end-user client 390, although as previously discussed, for the purpose of the present description, transmission server 380 is assumed to be connected to end-user client 390 through network 395, and therefore is assumed to be located at a physical distance from end-user client 390.

Figure 4:
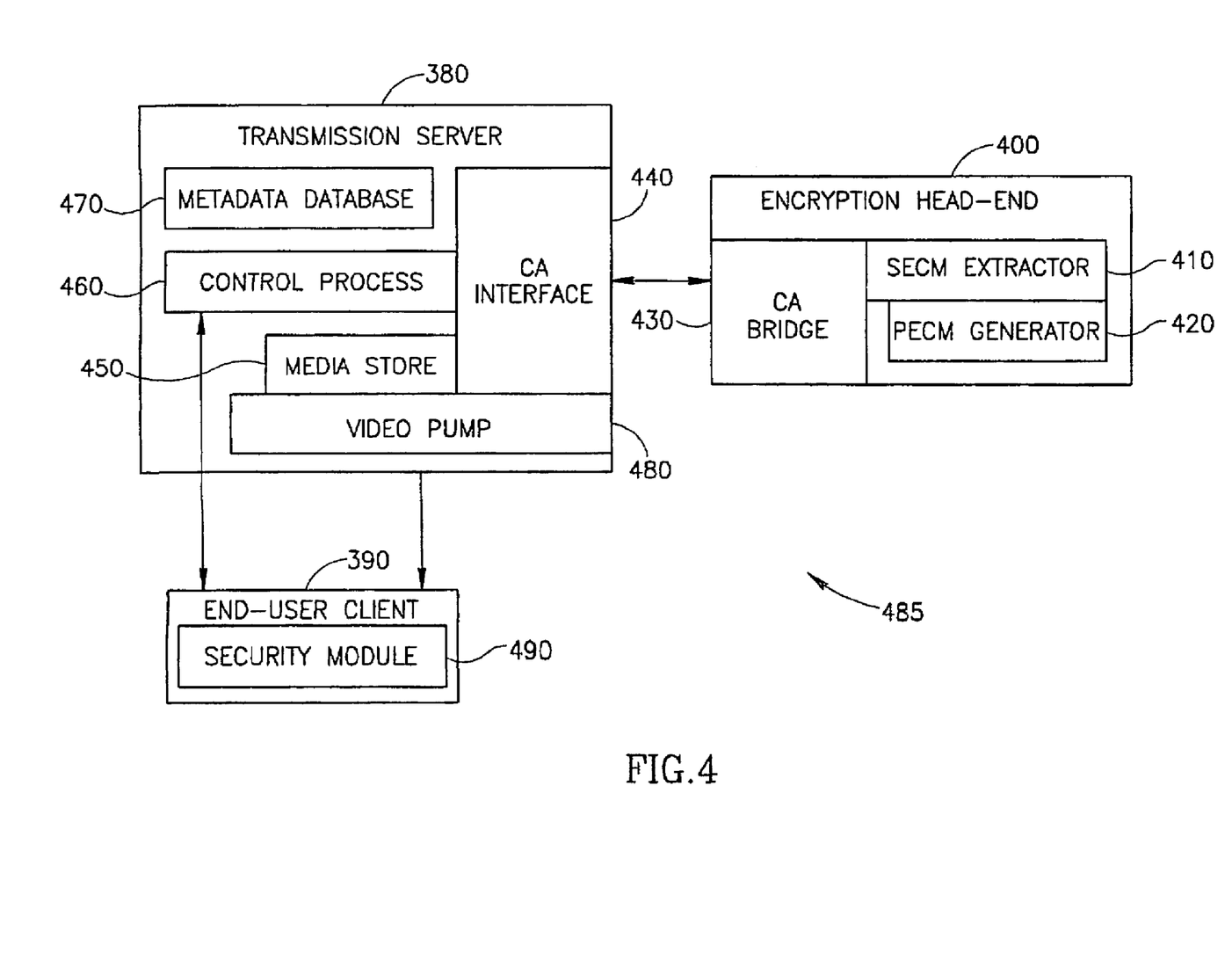
FIG. 4 is a schematic block diagram of an illustrative embodiment of a distributed media transmission server according to the present invention.

A preferred implementation for transmission server 380 is shown with regard to FIG. 4. Transmission server 380 is preferably connected to an encryption head-end 400, which receives a client identifier for end-user client 390 and a SECM (or at least the control word generating information contained in the SECM), and preferably uses this information to generate a PECM by a PECM generator 410. PECM generator 410 generates the PECM such that end-user client 390 is able to decrypt the encrypted data from at least control word generating information contained in that PECM. As noted, alternatively the control word itself is contained in the PECM. More preferably, only the particular end-user client 390 for which the PECM has been generated is able to use at least the control word generating information contained in the PECM in order to access the encrypted data, since the PECM, or at least the control word generating information, is generated at least partially according to one characteristic of end-user client 390. Therefore, preferably the control word generating information which is transmitted, in the form of the PECM, is personalized to prevent access by unauthorized users.

At least the control word generating information is preferably extracted from the SECM by a SECM extractor 420. This information is required to generate the PECM, or at least the control word generating information therein, by PECM generator 410. More preferably, the control word generating information is modified by PECM generator 410 in order to generate the PECM. Alternatively, SECM extractor 420 may optionally use the control word generating information to create a control word, which would then be used to produce translated control word generating information.

In any case, SECM extractor 420 may also optionally decrypt the SECM as part of the extraction process, if the SECM is received by SECM extractor 420 as encrypted data.

Optionally and more preferably, encryption head-end 400 is connected to transmission server 380 through a CA (conditional access) bridge 430.

PECM generator 410 preferably generates one or more PECMs, and more preferably generates one PECM for each SECM which is received. Each PECM contains control word generating information, translated from the SECM, which enables end-user client 390 to derive or generate the control word for allowing access to the encrypted content. Each PECM also most preferably contains at least a portion of the business rules from the SECM, but is encrypted such that preferably only the requesting end-user client 390 is able to decrypt the PECM. The algorithms for retrieving and/or generating the control word from each of SECM and PECM are preferably not identical. Each end user client 390 preferably has a separate algorithm and/or information which is required for generating the control word from the appropriate PECM.

Encryption of the PECM preferably incorporates either the client identifier, or information which is available to encryption head-end 400, for example through a look-up table, which is retrieved according to the client identifier. Encryption head-end 400 then returns each PECM to transmission server 380, preferably through CA bridge 430.

Transmission server 380 preferably features a CA (conditional access) interface 440 for retrieving SECMs from the (preferably separate) file in a media store 450. Media store 450 also preferably stores the encrypted content which is received from the content preparation station (not shown; see FIG. 3). CA interface 440 preferably receives instructions for determining which content to retrieve from a control process 460, which preferably receives and processes the request for content from end-user client 390. Control process 460 optionally and more preferably authenticates end-user client 390, for example by using an MD5 digest. In addition, control process 460 more preferably decomposes the request for content into the request for a sequence of segments from one or more physical files, most preferably according to meta-data information which is stored in a meta-data database 470.

Once the PECM has been generated, and optionally inserted into the transport stream or otherwise delivered to end-user client 390, the actual encrypted digital content is preferably streamed to end-user client 390 by a video pump 480. Video pump 480 is therefore optionally implemented according to any suitable delivery mechanism. Also optionally, video pump 480 inserts the PECM(s) into the transport stream as required.

Transmission server 380 and encryption head-end 400 may optionally be termed a transmission device 485, whether physically located together or separated.

Figure 5:
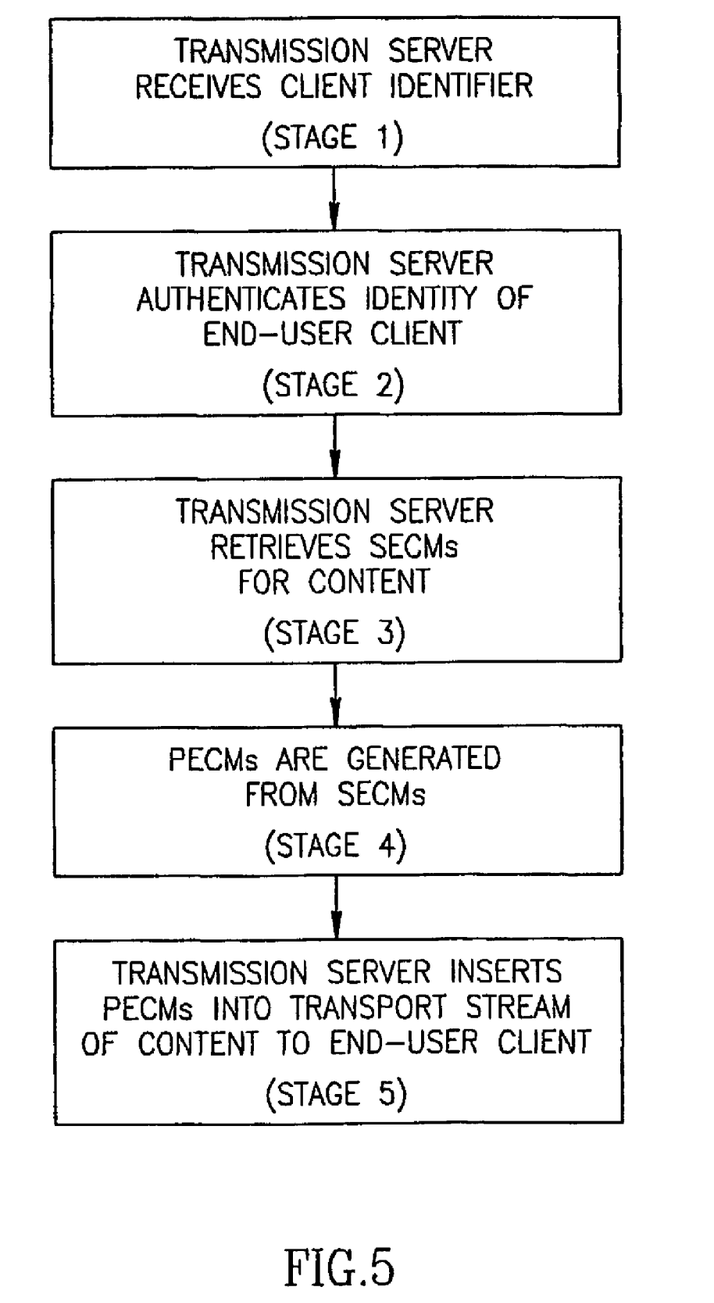
FIG. 5 is a flowchart of an exemplary method according to the present invention.

A preferred operation of the present invention with regard to FIG. 4 is preferably performed as follows, as also described with regard to the flowchart of FIG. 5. In stage 1, transmission server 380 preferably receives the client identifier from end-user client 390 when the user wishes to receive encrypted content. In stage 2, transmission server 380 then preferably authenticates the identity of end-user client 390 and also determines whether end-user client 390 (and hence the user) is entitled to receive the requested content.

If end-user client 390 is entitled to receive the content, then in stage 3, transmission server 380 retrieves the one or more SECMs which are associated with the content, and sends them with the identifier for end-user client 390 to encryption head-end 400. The SECMs may optionally be sent to encryption head-end 400 as a batch process at the start of the content transmission process, or alternatively may be sent individually to encryption head-end 400 as required. Encryption head-end 400 then generates one or more PECMs as previously described, in stage 4.

Transmission server 380 preferably inserts the PECMs into the transport stream of the digital media content as it is being streamed to end-user client 390 in stage 5, or otherwise delivers the PECMs to end-user client 390. The timing of the transmission is preferably determined such that end-user client 390 has sufficient time to receive and decrypt the PECM before the control word derived from the control word generating information in the PECM is required for decrypting the transmitted encrypted digital media content. Transmission server 380 transmits the requested digital content to end-user client 390.

According to preferred embodiments of the present invention, the timing of delivery of the PECM(s) to end-user client 390 is at least partially determined by the mode of operation of end-user client 390, such that transmission server 380 preferably receives information about this mode of operation from end-user client 390. Each PECM is preferably delivered to end-user client 390 a defined period of time before display of the relevant encrypted portion of the transport stream is performed. For example, such a defined period of time is optionally 0.5 seconds before the time of display.

Preferably, end-user client 390 features an additional operational mode, in which the user is able to "fast-forward" or skip at least a portion of the digital content, such that the digital content is not displayed according to a strictly linear sequence. This operational mode also requires the appropriate content to be transmitted by transmission server 380, such that at least a portion of the transport stream is skipped. However, such a mode of transmission is complicated both by the necessity to deliver the PECM(s) at the appropriate time and also by the requirements of transmitting streaming video data which has been compressed according to MPEG-2, according to the preferred embodiment of the present invention.

The MPEG-2 standard defines a mode of compression which partially relies upon redundancy within and between frames of the video data to reduce or remove unnecessary visual data. The removed data is chosen in order to minimize any degradation of the visual quality by exploiting properties of the human visual system. In particular, spatial encoding and temporal encoding are used to reduce unnecessary data. Spatial encoding reduces or removes spatial redundancy between different portions of the same picture or frame of the video data, by encoding a reduced number of pixels which are similar or identical, and then using this reduced number to fill the relevant areas of the picture.

Temporal encoding reduces or removes temporal redundancy between different pictures or frames of the video data, by using motion estimation and inter-frame prediction. For example, inter-frame prediction starts with one complete frame, or I-frame, as a basis from which other frames are then constructed from reduced transmitted data. Predicted frames, or P-frames, are predicted from either a previous I-frame or a previous P-frame. B-frames are another type of predicted frames, but are predicted bi-directionally from previous and/or subsequent P-frames or I-frames. In order to avoid or reduce propagation of error and/or the effect of dropped or missed frames, the frames are divided into Groups of Pictures (GOPs), which begin and end with a complete I-frame.

During the "fast-forwarding" procedure, the visual data, or frames, are delivered out of the strictly linear sequence, which clearly could be problematic for this type of encoding and compression. The present invention overcomes any potential problems by preferably sending only a portion of the visual data during the "fast-forwarding" procedure. More preferably, only the I-frames are sent, which provides sufficient visual quality without the difficulty of sufficiently rapid decoding of the visual data.

Transmission server 380 more preferably edits the transmitted stream of data in order for the essential portions to be transmitted and timely displayed during the "fast-forwarding" procedure. In order for such editing to occur sufficiently rapidly, according to a preferred embodiment of the present invention, at least a portion of the data is not encrypted. This portion more preferably includes the transport packets containing the start or end of any video PES packet and/or I-frame packet, for editing to be sufficiently rapid.

In order for end-user client 390 to be able to decrypt the portions of the visual data sufficiently rapidly, end-user client 390 needs to receive the PECM a sufficient period of time before the corresponding visual data is to be displayed. Transmission server 380 preferably calculates the position within the transport stream according to the relevant time of display by end-user client 390, and then sends each PECM a sufficient period of time before this display is required. This period of time preferably also includes time for generating the control word from the PECM and also decrypting the encrypted digital media content. Alternatively, as previously described, all required PECM(s) could optionally be sent at once, before the encrypted content is transmitted or at the start of transmission.

It should be noted that a similar procedure could also optionally be followed for "rewinding" or showing a previous portion of content, again out of sequence. In this case, selected parts of the visual stream are streamed to end-user client 390 but in reverse order. Again, the PECM(s) need to be transmitted a sufficient period of time before the content needs to be displayed.

Generally, the display of the content in a non-linear order according to the present invention relies upon some marker or feature within the content, for determining which alterations to the content are necessary for display out of sequence. For example, with regard to MPEG-2, preferably only the I-frames are transmitted, such that the content is edited for transmission of this type of data only. Other types of markers or features may also optionally be used. In this respect, the present invention may be distinguished from background art references such as PCT Application No. WO 01/35669, which rely upon heuristics for determining which content is to be displayed out of the sequential order.

These two implementations for displaying content out of a strictly linear sequence or order also preferably feature the separate storage of a SECM in a separate file, rather than storing this content with the file. As previously described, separate storage of the SECM enables the content to be more easily adjusted for display out of the strictly linear sequence or order.

According to a preferred but optional implementation of the present invention, end-user client 390 optionally and more preferably features a renewable, removable security module 490, such as a smartcard for example, for decrypting or otherwise unscrambling content which the user has requested, as previously described for background art FIGS. 1 and 2. Security module 490 is itself preferably secured, such that information contained within this module is protected from unauthorized access. Security module 490 receives and/or generates the necessary control word, and is then able to unscramble the received content for play back or other display. Most preferably, the operation of security module 490 is transparent or substantially transparent to the end user.

While the invention has been described with respect to a limited number of embodiments, it will be appreciated that many variations, modifications and other applications of the invention may be made.

What is claimed is:

1. A method for communicating digital media content in a video on demand environment, the method comprising:

storing at at least one location remote from a subscriber and accessible to a headend a multiplicity of encrypted video on demand programs and a multiplicity of non-personalized control word generating information for generating non-personalized control words for decryption of said multiplicity of encrypted video on demand programs;

responsive to receipt of a video on demand request from a subscriber for a subscriber-selected one of said multiplicity of encrypted video on demand programs, personalizing for the use of said subscriber non-personalized control word generating information for generating non-personalized control words to provide personalized control word generating information for generating personalized control words for decryption only by said subscriber of said subscriber-selected one of said multiplicity of encrypted video on demand programs; and thereafter and responsive to said video on demand request, transmitting to a set top box of said subscriber said subscriber-selected one of said multiplicity of encrypted video on demand programs and said personalized control word generating information for generating personalized control words for decryption only by said subscriber of said subscriber-selected one of said multiplicity of encrypted video on demand programs.

2. A method for communicating digital media content, the method comprising:

storing at at least one location remote from a subscriber and accessible to a headend a multiplicity of encrypted media content items and a multiplicity of non-personalized control word generating information for generating non-personalized control words for decryption of said multiplicity of encrypted media content items;

responsive to receipt of a media request from a subscriber for a subscriber-selected one of said multiplicity of encrypted media content items, personalizing for the use of said subscriber non-personalized control word generating information for generating non-personalized control words to provide personalized control word generating information for generating personalized control words for decryption only by said subscriber of said subscriber-selected one of said multiplicity of encrypted media content items; and thereafter and responsive to said media request, transmitting to a client device of said subscriber said subscriber-selected one of said multiplicity of encrypted media content items and said personalized control word generating information for generating personalized control words for decryption only by said subscriber of said subscriber-selected one of said multiplicity of encrypted media content items.

3. The method according to claim 2 further comprising: responsive to said media request, selecting a selected location from said at least one location for transmitting to a client device of said subscriber said subscriber-selected one of said multiplicity of encrypted media content items and said personalized control word generating information for generating personalized control words for decryption only by said subscriber of said subscriber-selected one of said multiplicity of encrypted media content items, wherein said selected location is selected according to at least one characteristic of said selected location.

4. The method according to claim 3 and wherein at least said personalized control word generating information is transmitted separately from said subscriber selected one of said multiplicity of encrypted media content items by said selected location.

5. The method according to claim 3 and wherein said personalized control word generating information is at least partially personalized according to at least one characteristic of said subscriber.

6. The method according to claim 5 and wherein said personalized control word generating information is transmitted to said subscriber, such that said subscriber generates said personalized control words.

7. The method according to claim 3 and wherein at least said personalized control word generating information is transmitted with said subscriber selected one of said multiplicity of encrypted media content items by said selected location.

8. The method according to claim 3 and wherein said subscriber selected one of said multiplicity of encrypted media content items is divided into a plurality of segments, each segment being encrypted with a different key.

9. The method according to claim 8 and wherein said plurality of segments form a linear sequence, and wherein at least one of said segments is displayed out of said linear sequence, such that at least personalized control word generating information for decryption only by said subscriber of at least one of said segments being displayed out of said linear sequence is transmitted by said selected location such that said at least one segment is decrypted in time for display.

10. The method according to claim 9 and wherein at least a portion of said at least one of said segments is edited by said selected location.

11. The method according to claim 10 and wherein said portion is selected according to at least one marker in said segment.

12. The method according to claim 11 and wherein said at least one marker is an I-frame for digital media content formatted according to MPEG-2.

13. The method according to claim 10 and wherein said portion is unencrypted at said selected location before being edited.

14. The method according to claim 3 and wherein said selected location further comprises an encryption head-end, and said encryption head-end personalizes at least said non-personalized control word generating information to form personalized control word generating information.

15. The method according to claim 14 and wherein said selected location further comprises a transmission server, and said transmission server transmits said subscriber-selected one of said multiplicity of encrypted media content items.

16. The method according to claim 15 and wherein said transmission server further transmits said personalized control word generating information.

17. The method according to claim 16 and wherein said subscriber-selected one of said multiplicity of encrypted media content items is transmitted in a transmission stream, and said personalized control word generating information is inserted into said transmission stream.

18. The method according to claim 16 and wherein said personalized control word generating information is transmitted separately from said subscriber-selected one of said multiplicity of encrypted media content items.

19. The method according to claim 2 and wherein said subscriber selects a selected location from said at least one locations for sending said media request.

20. The method according to claim 3 and wherein said selected location is selected according to quality of service deliverable to said subscriber.

21. Apparatus for communicating digital media content, the apparatus being at a location remote from a subscriber and accessible to a headend, the apparatus comprising:

a store for storing a multiplicity of encrypted media content items and a multiplicity of non-personalized control word generating information for generating non-personalized control words for decryption of said multiplicity of encrypted media content items;

an encryption headend, responsive to receipt of a media request from a subscriber for a subscriber-selected on6 of said multiplicity of encrypted media content items, for personalizing for the use of said subscriber non-personalized control word generating information for generating non-personalized control words to provide personalized control word generating information for generating personalized control words for decryption only by said subscriber of said subscriber-selected one of said multiplicity of encrypted media content items; and a transmission server, responsive to said media request, for transmitting to a client device of said subscriber said subscriber-selected one of said multiplicity of encrypted media content items and said personalized control word generating information for generating personalized control words for decryption only by said subscriber of said subscriber-selected one of said multiplicity of encrypted media content items.

22. Apparatus according to claim 21 and wherein said personalized control word generating information is personalized at least partially according to a characteristic of said subscriber.

23. Apparatus according to claim 21 and wherein said transmission server further comprises a video pump for transmitting said subscriber-selected one of said multiplicity of encrypted media content items and said personalized control word generating information for generating personalized control words for decryption only by said subscriber of said subscriber-selected one of said multiplicity of encrypted media content items simultaneously to said subscriber.

24. Apparatus according to claim 21 and wherein said transmission server further comprises a video pump for transmitting said subscriber-selected one of said multiplicity of encrypted media content items and said personalized control word generating information for generating personalized control words for decryption only by said subscriber of said subscriber-selected one of said multiplicity of encrypted media content items separately to said subscriber.

25. Apparatus according to claim 21 and wherein said encryption headend further comprises a decryptor for receiving encrypted decryption information and for decrypting said encrypted decryption information.

26. Apparatus for communicating digital media content, the apparatus being at a location remote from a subscriber and accessible to a headend, the apparatus comprising:

means for storing a multiplicity of encrypted media content items and a multiplicity of non-personalized control word generating information for generating non-personalized control words for decryption of said multiplicity of encrypted media content items;

personalization means, responsive to receipt of a media request from a subscriber for a subscriber-selected one of said multiplicity of encrypted media content items, for personalizing for the use of said subscriber non-personalized control word generating information for generating non-personalized control words to provide personalized control word generating information for generating personalized control words for decryption only by said subscriber of said subscriber-selected one of said multiplicity of encrypted media content items; and transmission means, responsive to said media request, for transmitting to a client device of said subscriber said subscriber-selected one of said multiplicity of encrypted media content items and said personalized control word generating information for generating personalized control words for decryption only by said subscriber of said subscriber-selected one of said multiplicity of encrypted media content items.

* * * * *

UNITED STATES PATENT AND TRADEMARK OFFICE
CERTIFICATE OF CORRECTION

PATENT NO. : 7,333,610 B2 Page 1 of 1
APPLICATION NO. : 10/344139
DATED : February 19, 2008
INVENTOR(S) : Dallard et al.

It is certified that error appears in the above-identified patent and that said Letters Patent is hereby corrected as shown below:

In column 4, line 24, delete "crypt-period" and insert therefor --crypto-period--.

In column 4, line 49, delete "thereof For" and insert therefor --thereof. For--.

In column 4, line 57, delete "SCHNEIDER, John Wiley 2and" and insert therefor --SCHNEIER, John Wiley $2^{nd}$--.

In column 8, line 7, delete "SCHNEIDER, John Wiley 2and" and insert therefor --SCHNEIER, John Wiley $2^{nd}$--.

In column 8, line 39, delete "crypt-period" and insert therefor --crypto-period--.

In column 8, line 41, delete "crypt-periods" and insert therefor --crypto-periods--.

In column 8, line 45, delete "crypt-period" and insert therefor --crypto-period--.

In claim 21 (column 14, line 63), delete "on6" and insert therefor --one--.

Signed and Sealed this

Twentieth Day of May, 2008

JON W. DUDAS
*Director of the United States Patent and Trademark Office*